July 21, 1970　　　　　　　G. HEIDRICH　　　　　　3,521,462
GEAR COUPLING

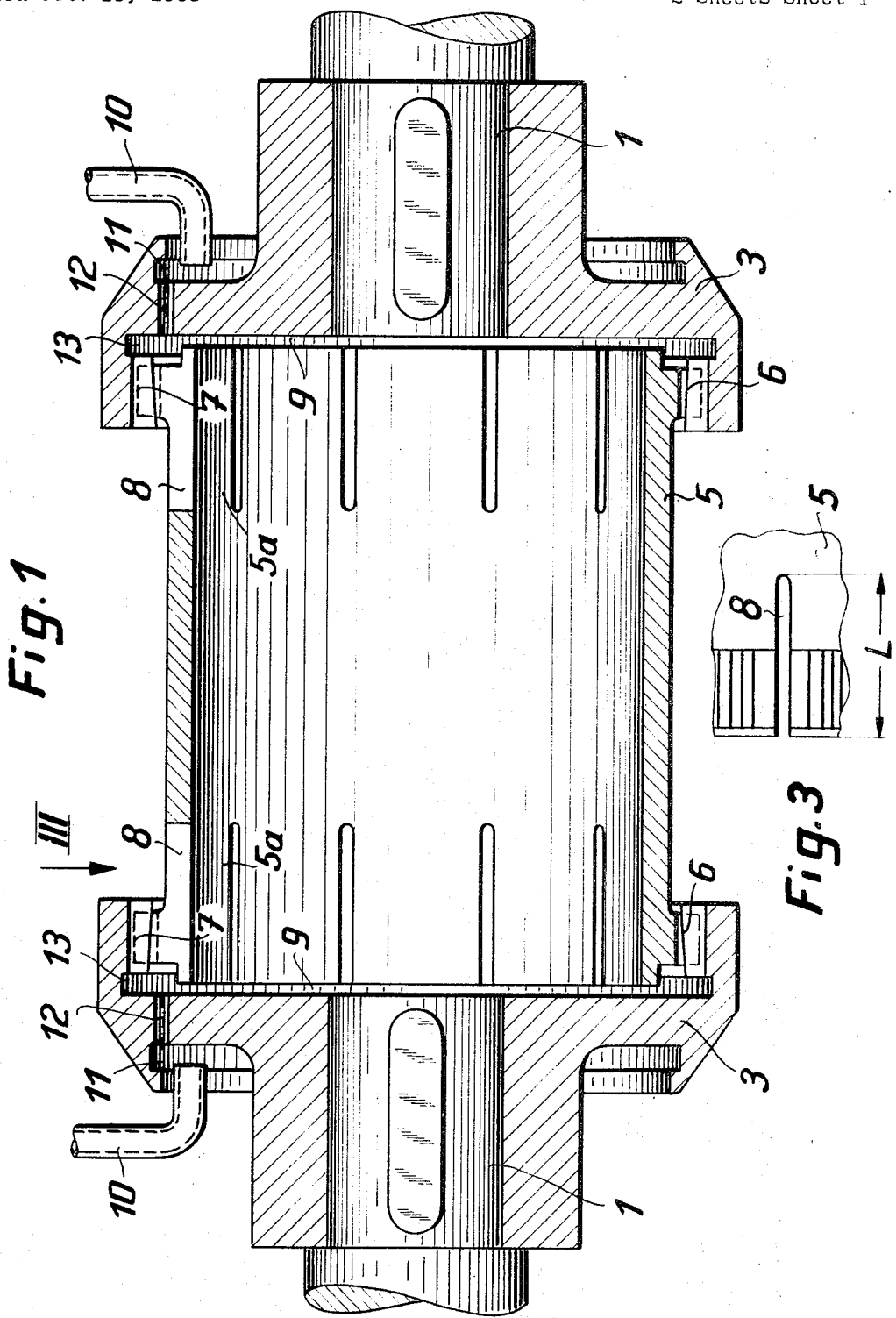

Filed Oct. 15, 1968　　　　　　　　　　　　　2 Sheets-Sheet 2

INVENTOR.
Gunther Heidrich
BY
Beaman & Beaman
attys

United States Patent Office 3,521,462
Patented July 21, 1970

3,521,462
GEAR COUPLING
Günther Heidrich, Munich, Germany, assignor to Alexander Stoeckicht, Munich, Germany
Filed Oct. 15, 1968, Ser. No. 767,697
Claims priority, application Germany, Oct. 21, 1967, 1,625,817
Int. Cl. F16d 3/54
U.S. Cl. 64—9                      3 Claims

ABSTRACT OF THE DISCLOSURE

The gear coupling consists of two toothed hub members connected by a sleeve member with toothed end portions. The sleeve teeth are in mesh with the hub teeth. The sleeve teeth or the hub teeth are external teeth. These externally toothed members are slotted from their ends at least over the width of the teeth. The so obtained radial elasticity of the external teeth allows uniform bearing of all teeth and centering of the sleeve with increasing speed by radial expansion of the slotted portions.

BACKGROUND OF THE INVENTION

The tendency for increased performance with the smallest possible machine dimensions opens a wide field of application to gear couplings because it is these couplings, which, as compared with other types of couplings, are particularly capable of transferring high torques with small coupling diameters.

They are generally constructed as double toothed gear couplings which are rigid with respect to torsion. They permit longitudinal displacements and, in certain limits, also angular deviations as well as displacements of the axes.

As a result of the tendency for greater performance per unit of machine volume, speeds have been increased whereby increased requirements are to be met by the couplings. Up to now, gear couplings have been constructed exclusively under aspects of strength. For low-speed gear couplings, this method is still sufficient. High-speed gear couplings, however, require further contemplations and measures.

Double gear couplings consist of at least three individual members: the two coupling hubs and the coupling sleeve. With a known type of gear coupling construction the hubs lap over the end portions of the coupling sleeve. In this arrangement, internal teeth provided on the coupling hub are steadily in mesh with external teeth provided on the coupling sleeve end portion. However, an inverse construction is known as well in which the end portions of the coupling sleeve grip over the internally disposed coupling hubs. The internal teeth of the coupling sleeve, in this construction, are in mesh with the external teeth of the coupling hubs.

What is of decisive importance for good operation characteristic with high-speed gear couplings apart from a weight as well as running balance is the exact centering of the coupling sleeve with respect to the two coupling hubs throughout the entire speed range to be covered by the coupling.

Several possibilities of centering double gear couplings are known. For instance, gear couplings have been built in which the centering takes place directly by means of the flanks of the coupling teeth themselves or by the tooth crests contacting the tooth bottom faces of the counter teeth. In another known embodiment, the coupling sleeve is centered by a mostly crowned spigot additionally arranged at the teeth.

All these known gear couplings, however, show the considerable disadvantage that, when operated at higher speeds, the members of the coupling will radially expand under the influence of the centrifugal force. The outer members having a larger diameter will expand more than the inner members. This will result in clearances of operation, namely both flank clearance and centering clearance, which exceed considerably the play at rest due to manufacture. Then there will no longer be a centering of the coupling sleeve effected either by means of the tooth flanks, the tooth crests or the spigot, so that eccentricities may occur within the coupling, which in turn generate very great out-of-balance forces. These forces may easily reach orders which may become a serious danger for the complete drive unit.

The centering at the tooth crests and by the spigot, in addition, constitute a redundance in determination which prevents a uniform bearing of all the teeth for torque transmission and thus a well-defined uniform distribution of the force. It is therefore more recommendable to effect the centering directly at the tooth flanks and furthermore to take suitable measures to increase the centering effect of the teeth. Known measures for this are, for instance, a pressure angle of the tooth profile of more than 20°, longitudinally crowned tooth flanks, a lowest possible weight of the coupling sleeve to be centered, hardening of the coupling teeth by nitridation and good continuous lubrication.

In order to obtain said measures, the following features have already become known: Radial oil supply bores in the center of each tooth gap of the external toothing, convex shape of the tooth crests of the internal teeth and tapering of the teeth towards their bearing flank faces. These measures, however, are expensive.

The invention is based on the problem of providing a gear coupling which will be automatically centered even with high operational speeds.

SUMMARY OF THE INVENTION

The problem is solved by a gear coupling consisting of two toothed coupling hubs which are connected by means of a coupling sleeve having teeth at the two end portions thereof which coupling is characterized in that the internally disposed coupling members provided with external teeth are axially slotted from their ends at least through the region of the teeth.

By this axis parallel slotting the enclosed portions of the gear coupling can expand in a greater extent than the outer portion under the effect of the centrifugal force. In this way, a close backlash-free contact of the flanks and along with it a good centering are obtained especially with high speeds. Even the play at rest due to manufacture is completely eliminated in this way with increasing speed. This may be of considerable importance for the gear coupling especially in cases where it is operated for longer periods of time in a partial-load region in which the centering forces resulting from the torque are still too small to effect by themselves a central running of the coupling sleeve.

Gear couplings up to now always have been rigid with respect to torsion, because the tooth resiliency is only of unimportant magnitude. But now, due to the paraxial slots from the ends of the coupling sleeve, a torsional elasticity is obtained for the coupling, the amount of which may be adapted to the requirements of the engine set. The gear coupling in accordance with the invention, thus, is no longer resistant to torsion as are the conventional gear couplings.

In one embodiment of the invention the slotted end portions of the sleeve member are provided with external teeth and the hub members each have internal teeth formed on a hub shoulder.

According to another embodiment of the invention the end portions of said sleeve member have internal teeth and the hub members are provided with slotted wall portions carrying external teeth.

BRIEF DESCRIPTION OF THE DRAWING

The invention will now be described in more detail by way of two examples of embodiment shown in the drawing.

FIG. 1 shows a longitudinal sectional view taken on line I—I of FIG. 2 of a first embodiment of the double gear coupling in accordance with the invention, FIG. 3 shows a plan view of one of the paraxial slots in the coupling sleeve in the direction of the arrow III of FIG. 1.

DESCRIPTION OF TWO PREFERRED EMBODIMENTS

Figure 4:
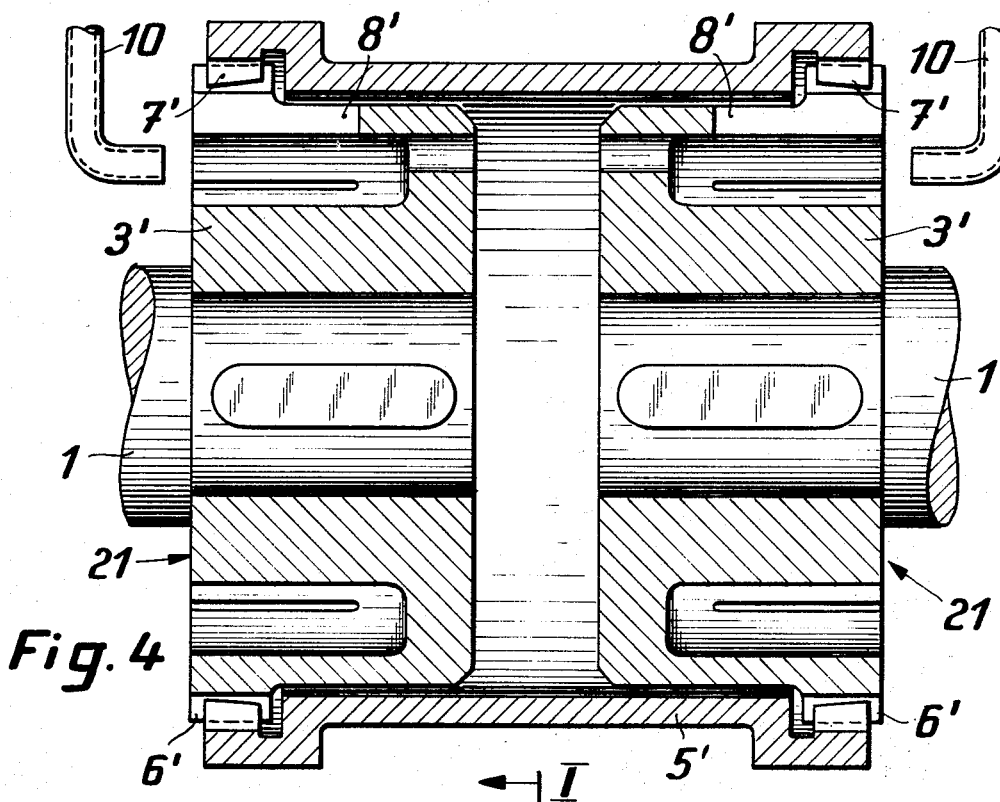
FIG. 4 shows a longitudinal sectional view of a second embodiment of the coupling in accordance with the invention.

FIG. 1 shows the shaft ends 1 to be coupled with each other. Coupling hubs 3 are non-rotatably fitted to these shaft ends. A coupling sleeve 5 is disposed between the coupling hubs 3.

The parts of the hubs 3 facing towards each other are provided with annular internally toothed shoulders. The teeth 6 of these internal toothings are in mesh with teeth 7, which are provided as external teeth at the end portions 5a of the sleeve 5.

Longitudinally extending slots 8 are provided in the sleeve 5 which divide the annular cross sectional area of the end portions 5a of the sleeve 5 into partial pieces. A gap 9 formed between the end portions 5a of the coupling sleeve 5 and the two coupling hubs 3 allows longitudinal axial displacements of the sleeve with respect to the hub.

The centering of the coupling sleeve 5 in the coupling hubs 3 is effected directly at the tooth flanks of the coupling toothings 6 and 7. The tooth flanks of the internal teeth of the hubs 3, in this arrangement, are longitudinally crowned whereby flexibility is increased and bearing at the edges is prevented.

The lubricating oil is supplied to the coupling via nozzle pipes 10 which inject the oil into outer pressure chambers 11, from which it flows into inner pressure chambers 13 via bores 12. These inner pressure chambers border on the annular volume with the meshing toothings.

Figure 2:
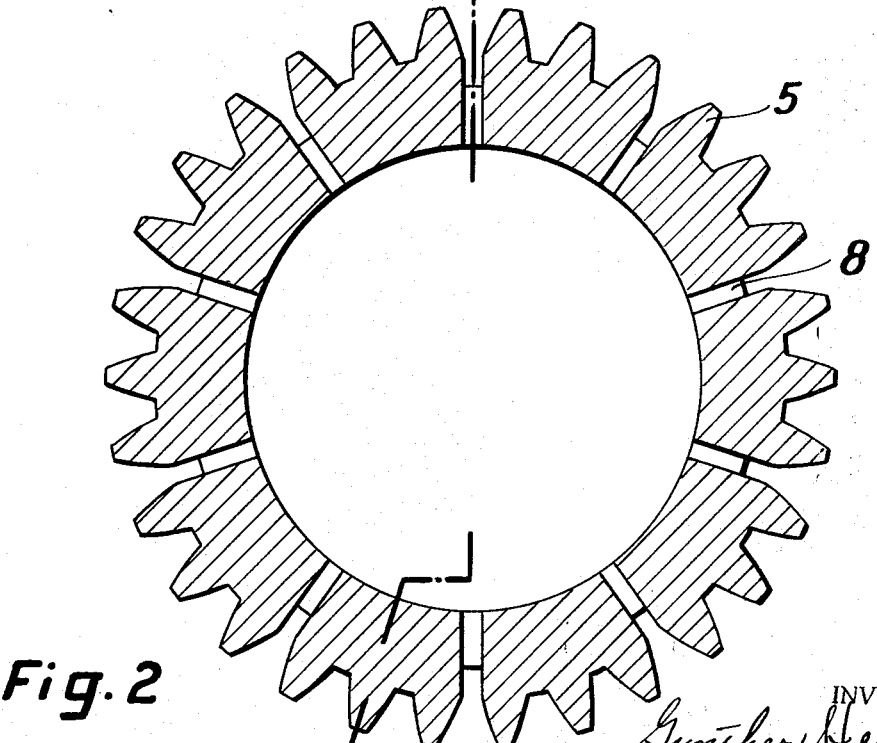
FIG. 2 shows a cross sectional view of the teeth of the gear coupling sleeve shown in FIG. 1.

As will be seen from FIG. 2, with this embodiment ten slots 8 are respectively provided in the sleeve. The length L of these slots according to FIG. 3 may be freely selected and is dependent upon the data of operation of the tooth coupling such as, for example, the performance or the speed. In addition, the length of the slots 8 is the decisive factor for the torsional elasticity of the coupling.

The operation of the coupling is as follows: When starting, centrifugal forces are generated in the rotating parts which will more or less try to expand the individual annular cross sectional areas of the coupling sleeve in dependence upon the radius of rotation. It will then be the result of the increased radial elasticity of the sleeve portions 5a due to the slots 8 that the sleeve end portions 5a basing annular cross section and subdivided by slots 8 will be capable of an increased expansion under the effect of the centrifugal forces as compared with the non-subdivided annular shoulder of the coupling hubs 3 provided with the internal tooth. The result is that with increasing speed not only the back lash at rest depending on manufacture will be always completely eliminated but also an adjustment of the sleeve will be effected by the tooth flanks which will result in a good centering of the coupling sleeve 5 in the hubs 3.

The increased elasticity of the end portions 5a of the coupling sleeve 5 allows, moreover, that with an acting torque the centering effect of the tooth forces resulting from the torque may become fully effective because there is always a backlash-free meshing of the coupling teeth even with very high speeds.

The increase of the centric adjustability of the coupling by the measures described, in addition, results in a uniform distribution of forces also with high speeds, so that all the teeth are equally participating in the torque transmission thereby considerably increasing the working life of the coupling depending primarily on over-stressing the tooth flanks.

In the practice of the invention it is not necessary to limit the location of the slots 8 in the sleeve 5. As will be seen from FIG. 4, in which corresponding parts are indicated by the primed numerals the coupling hubs 3′ may also be paraxially slotted from their end faces 21 facing away from each other. In this embodiment, the coupling hubs 3′ are provided with external teeth 6′ which are disposed adjacent the hub end faces 21 facing away from each other. The teeth 6′ are in mesh with the internal teeth 7′ of the coupling sleeve 5′.

What I claim is:

1. A gear coupling for drivingly interconnecting a pair of substantially coaxial rotatable shafts particularly suitable for use with high rotational speeds comprising, in combination, first and second hub members adapted to be separately mounted upon substantially parallel rotatable shafts and each having an axis of rotation, an annular set of teeth defined upon each of said hub members substantially concentric with the axis thereof, a sleeve member having an axis of rotation interposed between said hub members and having first and second annular sets of teeth defined thereon substantially concentric to said sleeve member axis and axially spaced with respect to each other, axially extending portions defined on said members and said sets of teeth of said members being defined on said axially extending portions, said first set of teeth of said sleeve member meshing with the set of teeth of said first hub member and said second set of teeth of said sleeve member meshing with the set of teeth of said second hub member wherein, with respect to intermeshing sets of teeth, one of said members is radially disposed inwardly of the other, said axially extending portion of the radially inwardly disposed member being of reduced radial wall thickness, and axially extending slots defined in said axially extending portion of the inwardly disposed member extending through the radial thickness of said portion and axially aligned with and of a greater axial length than the associated teeth whereby the teeth of said inwardly disposed member are capable of radial deflection outwardly under the influence of centrifugal force to improve the engagement with the associated set of teeth on the member radially disposed outwardly of the associated inwardly disposed member during rotation of the coupling.

2. In a gear coupling as in claim 1 wherein said sets of teeth on said sleeve member are external and said sets of teeth on said hub members are internal wherein said sleeve member teeth are radially inwardly disposed with respect to said hub member teeth, and said slots are defined in said sleeve member.

3. In a gear coupling as in claim 1 wherein said sets of hub member teeth are external and said sets of teeth on said sleeve member are internal wherein said hub member teeth are radially inwardly disposed with respect to said sleeve member teeth and said slots are defined in said hub members.

References Cited

UNITED STATES PATENTS

| | | | |
|---|---|---|---|
| 1,942,782 | 1/1934 | Smith | 64—9 |
| 2,338,758 | 1/1944 | Fast | 64—9 |
| 2,726,523 | 12/1955 | Zrodowski | 64—9 |

JAMES A. WONG, Primary Examiner